United States Patent [19]

Shibayama

[11] Patent Number: 5,021,886
[45] Date of Patent: Jun. 4, 1991

[54] VIDEO SIGNAL PROCESSOR FOR A COLOR LIQUID CRYSTAL DISPLAY
[75] Inventor: Kenji Shibayama, Tokyo, Japan
[73] Assignee: Victor Company of Japan, Limited, Yokohama, Japan
[21] Appl. No.: 493,887
[22] Filed: Mar. 15, 1990
[30] Foreign Application Priority Data
  Mar. 23, 1989 [JP] Japan .................................. 1-70946
[51] Int. Cl.$^5$ .......................................... H04N 5/14
[52] U.S. Cl. .................................. 358/170; 358/171; 358/172; 358/236; 340/784
[58] Field of Search ............. 358/170, 171, 172, 36, 358/37, 166, 167, 177, 178, 59, 236, 241; 340/784, 721

[56] References Cited
  U.S. PATENT DOCUMENTS
  2,999,127  9/1961  Fisher ................................ 358/170
  3,560,645  2/1971  Wallace ............................. 358/170
  3,980,815  9/1976  Kaneko ............................. 358/170
  4,617,590 10/1986  Dann .................................. 358/34

Primary Examiner—Tommy P. Chin
Assistant Examiner—Sherrie Hsia
Attorney, Agent, or Firm—Koppel & Jacobs

[57] ABSTRACT

A video signal processor for processing a composite video signal to be fed to color liquid crystal (LC) panels of a color liquid crystal display which are each assigned to a different color. The pedestal level of each color signal included in the video signal and to be fed to particular one of the LC panels is caused into coincidence with the level of an input signal which reduces the transmittance of the LC panel to the lowest transmittance. The pedestal level is caused to agree with the clipping level of either one of a dark and a white clipping circuit, whereby signal components lower than the pedestal level are removed. The processor insures the maximum contrast available with LC panels and eliminates light-and-dark inversion, thereby enhancing the reproduction of high quality pictures.

6 Claims, 11 Drawing Sheets

VIDEO SIGNAL PROCESSOR FOR A COLOR LIQUID CRYSTAL DISPLAY

BACKGROUND OF THE INVENTION

The present invention relates to a video signal processor for a liquid crystal display (LCD), particularly a color LCD.

A display using liquid crystal (LC) is extensively used with various kinds of equipment. Especially, color LC is a recent achievement in the imaging art and is drawing much attention as a promising substitute for the traditional cathode ray tube of a color television (TV). Actually, a portable miniature color TV and a wall-hanging type color TV implemented by color LC are available today. A color LCD has a plurality of color LC panels which are driven by a drive circuit. While the drive circuit drives the individual LC panels, a video signal processor processes an incoming composite video signal and delivers the resultant signal to the LCD to cause the latter to display it. Usually, the video signal processor has a Y/C separating circuit for separating a luminance signal (Y signal) and a color signal or chroma signal (C signal) from the composite video signal and outputting the Y and C signals. A decoder generates chrominance signals R-Y and B-Y in response to the Y and C signals. A matrix circuit is supplied with the Y signal and the chrominance signal R-Y and B-Y and in turn generate color signals R (red), G (green), and B (blue). The matrix circuit feeds each of the color signals R, G and B to a different clamping circuit. In response, each clamping circuit clamps the blanking level or pedestal level of the associated color signal, R, G or B to one half of a predetermined peak-to-peak voltage level of a video signal which should be applied to the associated LC panel of particular color. A switching circuit is associated with each of the clamping circuits for switching the output signal of the latter to produce an inverted and a non-inverted signal alternately field by field, the inverted and non-inverted signals being applied to the associated LC panel. Such switching circuits serve to extend the service life of the LC panels.

The prior art video signal processor has a problem left unsolved, as follows. When the inverted and non-inverted signals to be applied to any of the LC panels include components which are lower than the pedestal level (e.g. undershoot components), a reproduced picture appears double to the viewer's eye at the edges thereof due to the inherent relationship between the color signal lever and the transmittance of the LC panel. Generally referred to as light-and-dark inversion, this kind of phenomenon degrades the picture quality to a critical extent. While such an occurrence may be coped with by changing the pedestal level with the undershoot components being taken into account, this brings about another problem that a picture cannot be reproduced with sufficient contrast.

SUMMARY OF THE INVENTION

It is therefore an object of the present invention to provide a video signal processor for a LCD which insures the maximum contrast available with LC panels, eliminates the degradation of picture quality ascribable to light-and-dark inversion, and thereby reproduces a picture of high quality.

It is another object of the present invention to provide a generally improved video signal processor for a LCD.

A video signal processor for processing a video signal to be fed to a LC panel which displays a reproduced picture thereon of the present invention comprises a clipping circuit for removing signal components lower than a pedestal level of the video signal to be fed to the LC panel, and a clamping circuit of causing either one of a input signal to and an output signal from the clipping circuit to coincide with the voltage level of an input voltage which reduces the transmittance of the LC panel to the lowest transmittance.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENTS

Figure 1:
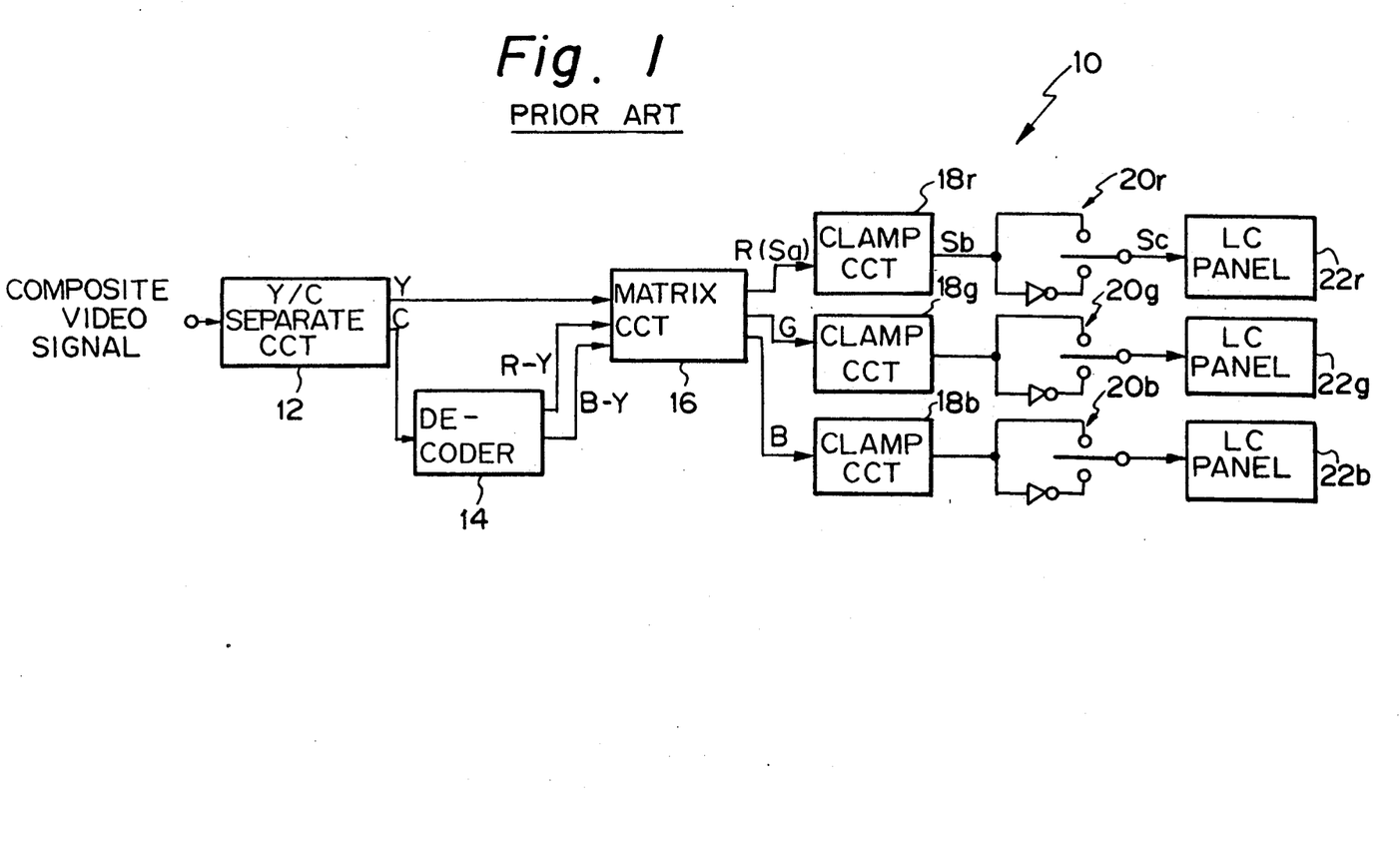
FIG. 1 is a block diagram schematically showing a video signal processor associated with a prior art color LDC.
Figure 2A:
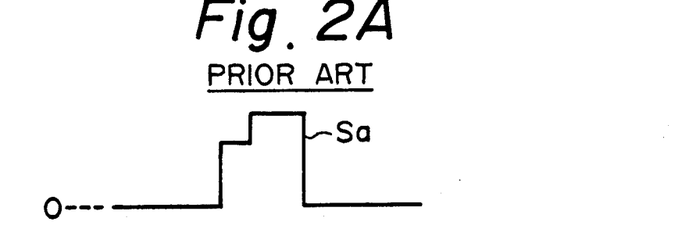
FIGS. 2A to 2C are diagrams representative of the waveforms of signals which may be outputted from various sections of the processor shown in FIG. 1.
Figure 2B:
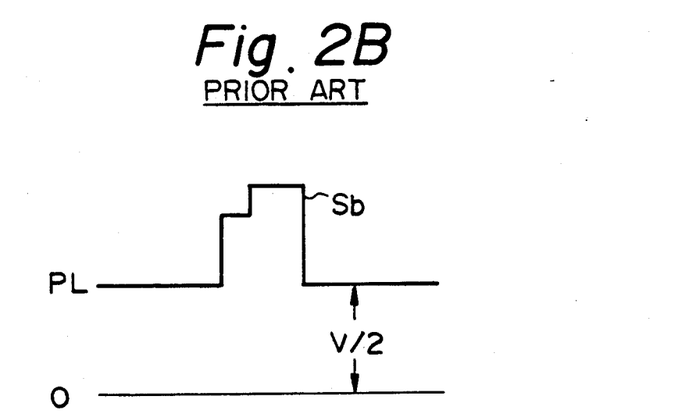
Figure 2C:
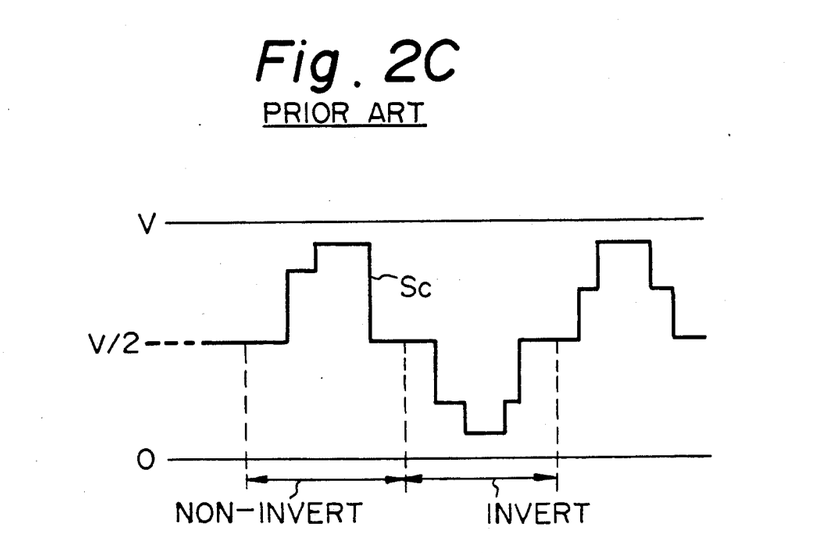

To better understand the present invention, a brief reference will be made to a prior art video signal processor for a color LCD, shown in FIG. 1. As shown, the video signal processor, generally 10, has Y/C separating circuit 12 which separates a Y signal and a C signal from an incoming composite video signal. The C signal is fed to a decoder 14 which in turn generates chrominance signals R-Y and B-Y. The chrominance signals R-Y and B-Y are delivered to a matrix circuit 16 together with the Y signal. In response, the matrix circuit 16 produces three color signals R, G and B. The color signal R, for example, is represented by a signal Sa in FIG. 2A. The signals R, G and B are applied to clampings circuits 18r, 18g and 18b, respectively. Each of the signals R, G and B has a blanking level or pedestal level PL thereof clamped by the associated clamping circuit 18r, 18g or 18b to one half of the predetermined peak-to-peak voltage of the video signal. For example, assuming that the predetermined peak-to-peak voltage is V, the clamped pedestal level PD is V/2. The clamped signal R is represented by a signal Sb in FIG. 2B. The outputs of the clamping circuits 18r, 18g and 18b are respectively fed to switching circuits 20r, 20g and 20b, and each is switched over to an inverted signal inverted with respect to the voltage V/2 and a non-inverted signal field by field. The switched signal R, for example, is represented by a signal Sc in FIG. 2C. The switchover to the inverted and non-inverted signals is effected to increase the service life of LC panels 22r, 22g and 22b, as stated earlier.

Figure 3:
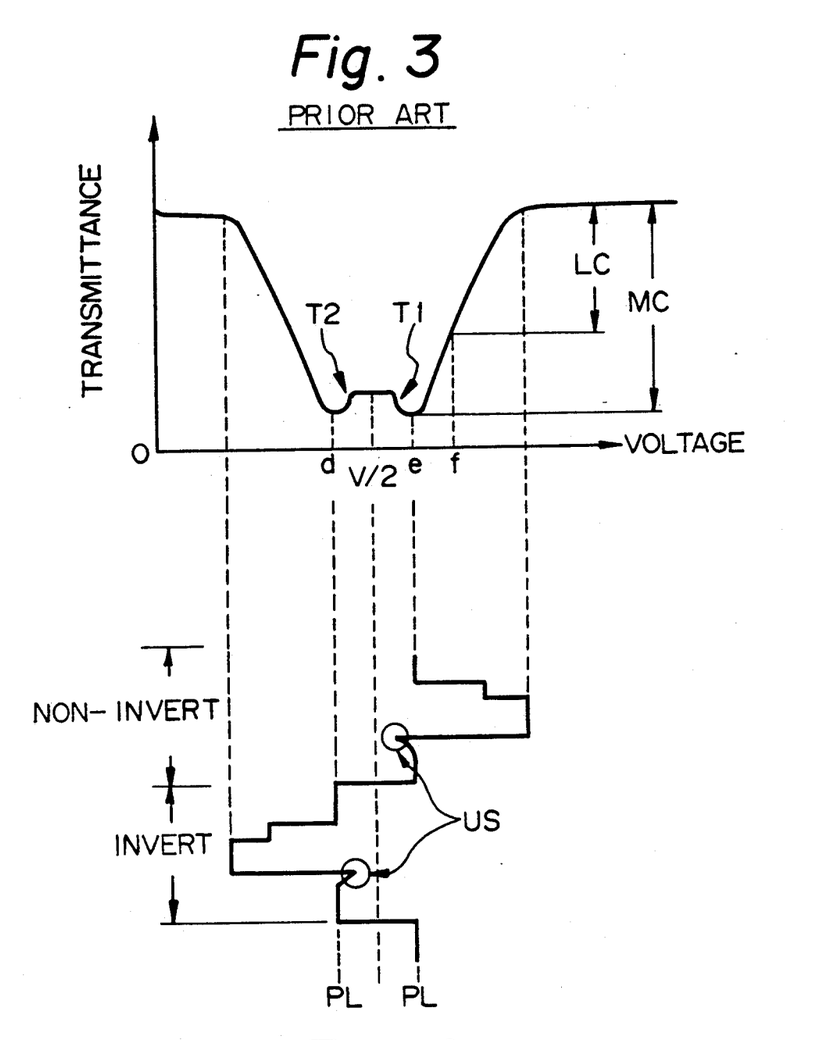
FIG. 3 is a graph indicative of a relationship between the voltage applied to an LC panel and the transmittance of the LC panel useful for understanding a drawback particular to the prior art.
Figure 4:
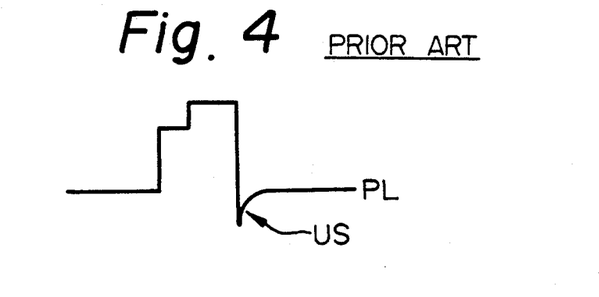
FIG. 4 shows a specific waveform including an undershoot component.

FIG. 3 shows a relationship between the voltage of any one of the color signal R, G and B fed to the associated LC panel and the transmittance of the LC panel. As shown, the transmittance is lowest (darkest) at voltages d and e of the color signal. It follows that the maximum contrast will be achieved if the pedestal level of the color signal arriving at the LC panel is coincident with the voltage e for the non-inverted signal and with the voltage d for the inverted image. However, this kind of scheme gives rise to a problem when a color signal including an undershoot component US, FIG. 4, lower than the pedestal level PL is fed to the LC panel. Specifically, assuming that the pedestal level is equal to the point e (or point d), the transmittance of the LC panel again increases to $T_1$ (or $T_2$) in response to the understood component US, as shown in FIG. 3. This causes the light-and-dark inversion to occur as previously stated, i.e., causes the edges of a reproduced image to appear double to the viewer's eye, degrading the quality of the picture to a noticeable extent.

More specifically, as the voltage lever of the color signal being applied to any of the LC panels lowers sequentially, the pictures becomes darker sequentially. When the voltage level reaches the pedestal level PL, i.e, the level at the point e, the picture becomes darkest. However, when the undershoot component US or similar signal component lower than the pedestal level PL arrives at the LC panel, the resultant picture will appear light despite that it should have the lowest luminance, as indicated by $T_1$ or $T_2$ in FIG. 3.

By taking account of the undershoot component US or similar signal component lower than the pedestal level PL, the pedestal level PL may be shifted from the point e (or point d) to a point f, for example, as also shown in FIG. 3. This, however, makes it impossible to provide a picture with the maximum contrast as shown in FIG. 3.

Preferred embodiments of the video signal processor in accordance with the present invention will be described hereinafter. In the drawings, the same or similar components as those of the prior art video signal processor 10 are designated by like reference numerals, and redundant description will be avoided for simplicity.

FIRST EMBODIMENT

Figure 5:
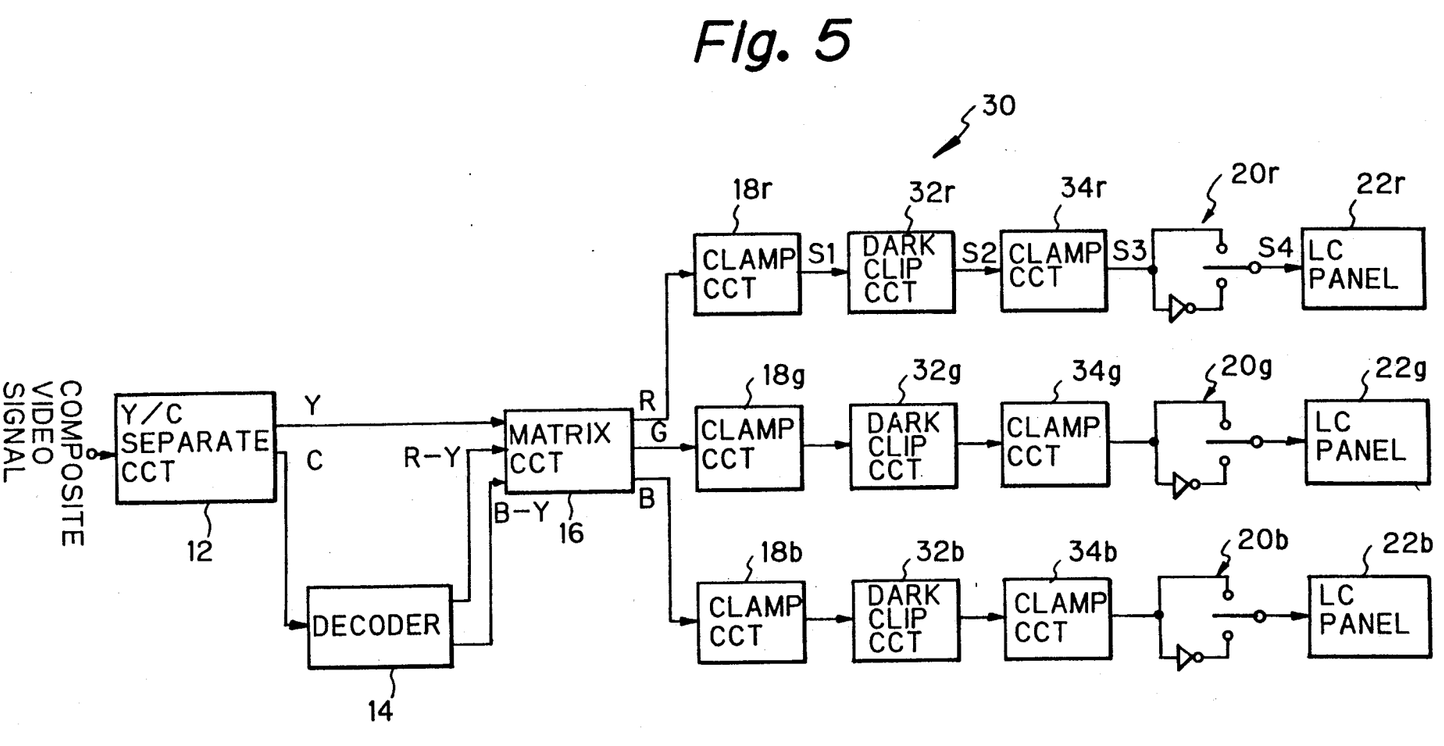
FIG 5 is a schematic block diagram showing a color LCD embodying the present invention.
Figure 6A:
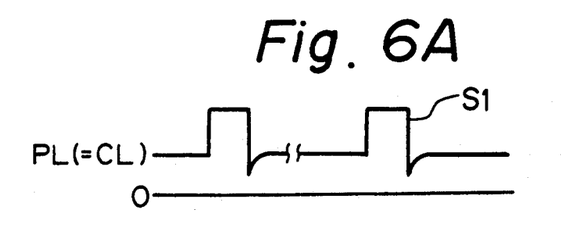
FIGS. 6A to 6D are diagrams each showing the waveform of a signal appearing in a different section of the video signal processor shown in FIG. 5.
Figure 6B:
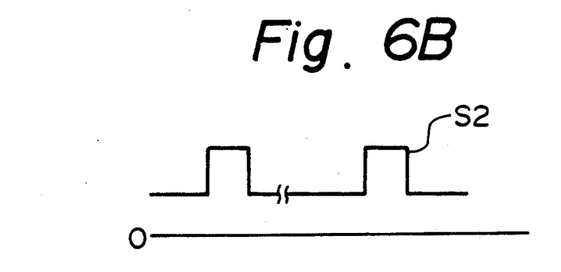
Figure 6C:
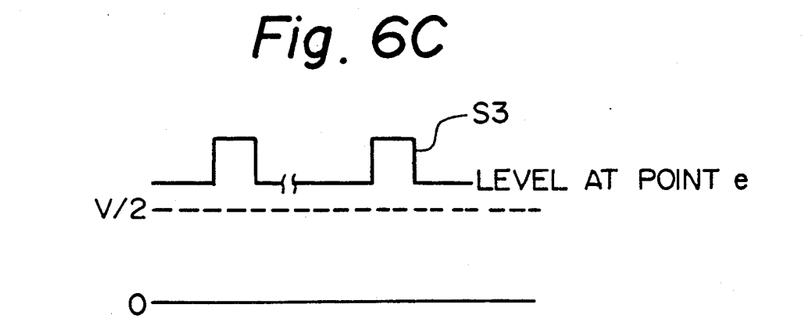
Figure 6D:
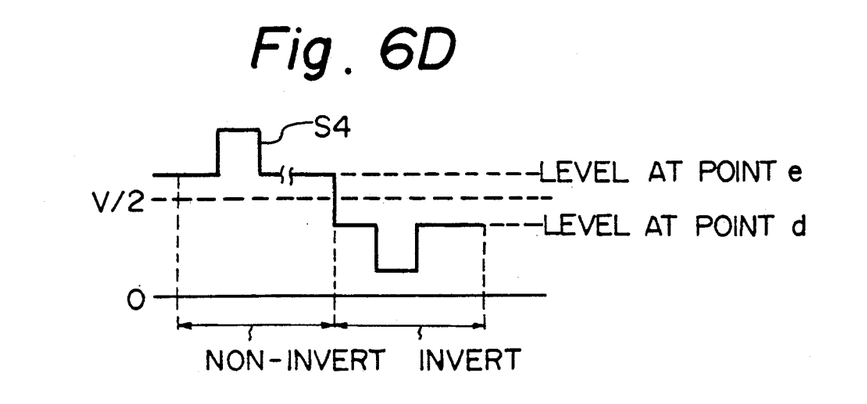
Figure 7:
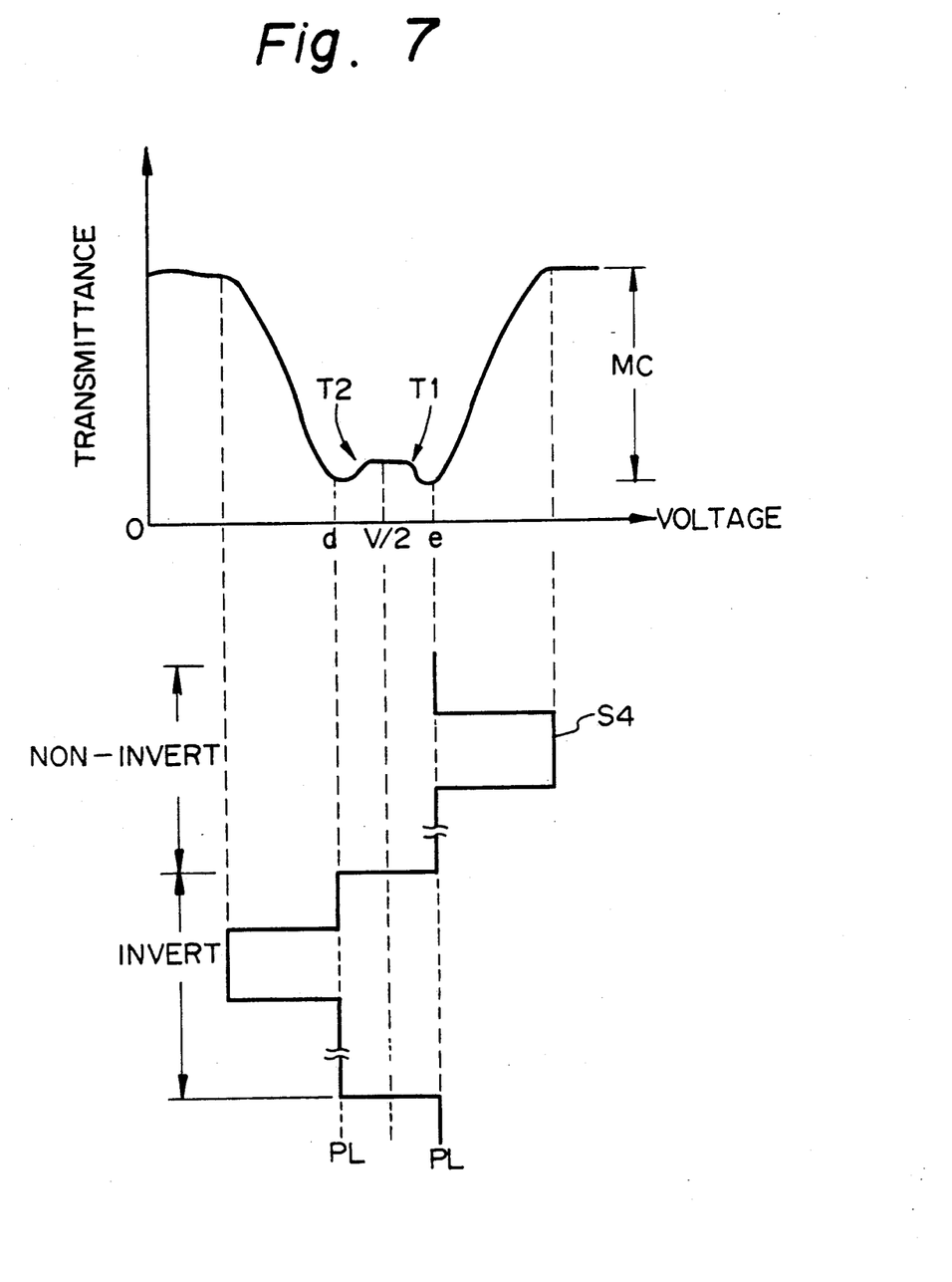
FIG. 7 is a graph showing the relationship between the voltage applied to a LC panel and the transmittance of the LC panel demonstration the principle of the illustrative embodiment.

Referring to FIG. 5, a video signal processor embodying the present invention is shown and generally designated by the reference numeral 30. The video signal processor 30 has a Y/C separating circuit 12 for separating a Y and C signal from an incoming composite video signal. A decoder 14 is supplied with the C signal and in turn generates chrominance signals R-Y and B-Y. Supplied with the chrominance R-Y and B-Y, a matrix circuit 16 produces color signals R, G and B and delivers the color signals R, G and B to clamping circuits 18r, 18g and 18b, respectively. The clamping circuits 18r, 18g and 18b cause the pedestal level of their associated color signals R, G and G to coincide with the clipping levels CL of dark clipping circuits 32r, 32g and 32b which follow the circuits 18r, 18g and 18b, rspectively. For example, the color signal R whose pedestal level PL is coincident with the clipping level CL of the dark clipping circuit 32r is represented by a signal $S_1$ in FIG. 6A. The clipping levels of the dark clipping circuits 32r, 32g 32b are selected such that the circuits 32r, 32g and 32b are operable stably without being effected by the average picture levels of the associated color signals R, G and B. The dark clipping circuits 32r, 32g and 32b remove from the outputs of the associated clamping circuits 18r, 18g and 18b, i.e., color signals R, G and B whose pedestal levels PL are coincident with the associated clipping levels CL the signal having levels which are lower than the pedestal levels PL (e.g. undershoot components). Regarding the color signal R, for example, FIG. 6B shows a signals $S_2$ from which such undesirable signal components have been removed. The clipping outputs of the dark clipping circuits 32r, 32g and 32b are fed to clamping circuits 34r, 34g and 34b, respectively. The clamping circuits 34r, 34g and 34b each causes the pedestal level PL of the associated color signal R, G or B to agree with a particular voltage level which reduces the transmittance of the associated LC panel 22r, 22g or 22b to the lowest one, e.g. the voltage level at a point e shown in FIG. 7. Regarding the color signal R, for example, FIG. 6C shows a signal $S_3$ the pedestal level PL of which is coincident with such a voltage level. The output signals of the clamping circuits 34r, 34g and 34b are fed to switching circuits 20r, 20g and 20b, respectively. Each of the switching circuits 20r, 20g and 20b inverts and non-inverts the output signal of the associated clamping circuit 34r, 34g or 34b alternatively field by field, the resultant signal being applied to one of LC panels 22r, 22g and 22b to which the switching circuit is interconnected. FIG. 6D shows a signal $S_4$ representative of the inverted and non-inverted signals of the color signal R by way of example. The inversion/non-inversion at the individual switches 20r, 20g and 20b is effected with respect to the previously mentioned voltage V/2 which is one half of the peak-to-peak voltage. This is because the differences between the voltages at the points d and e where the individual LC panels have the lowest transmittance and the voltage V/2 are the same in the absolute value, and because the pedestal level PL of the inverted signal coincides with the voltage level at the point d. FIG. 7, like FIG. 3, is representative of a relationship between the transmittance of the LC panels and the voltage of the signals, R, G and B applied to the individual LC panels.

Figure 8:
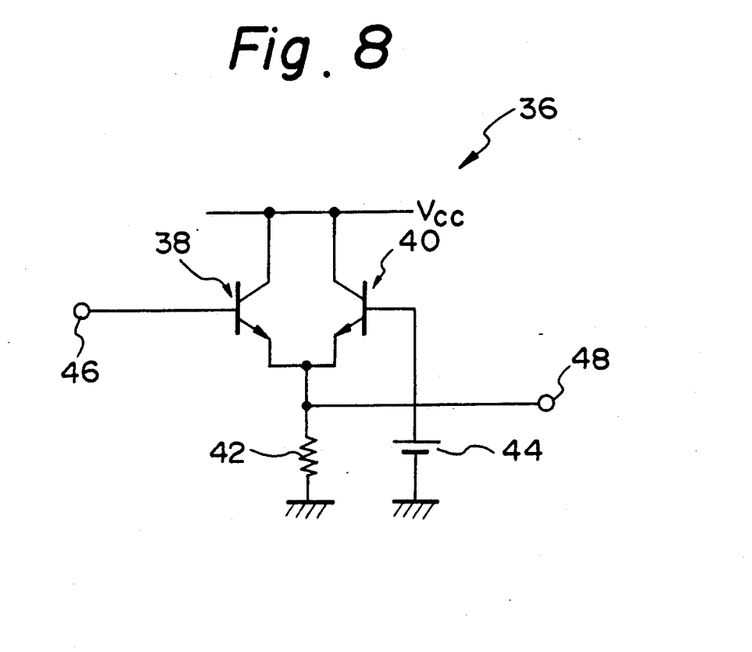
FIG. 8 is a diagram representative of a specific construction of a dark clipping circuit included in the illustrative embodiment.
Figure 9A:
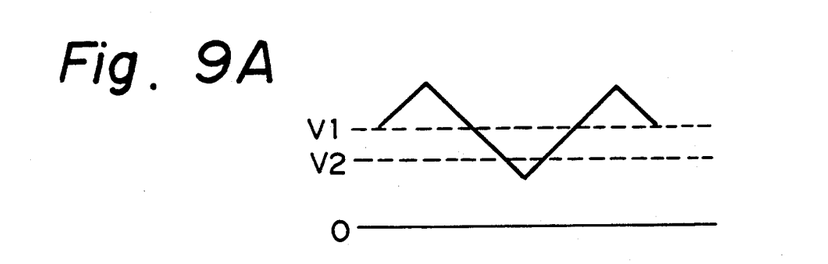
FIGS. 9A and 9B are diagrams showing the waveforms of signals appearing in different sections of the dark clipping circuit of FIG. 8.
Figure 9B:
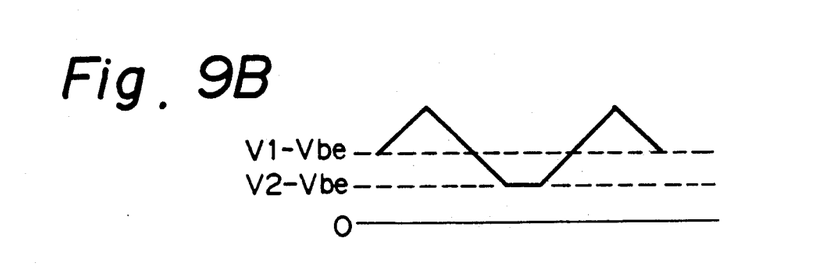

Referring to FIG. 8, a specific construction of each of the dark clipping circuits 32r, 32g and 32b is shown. As shown, the dark clipping circuit, generally 36, is made up of two transistors 38 and 40, a resistor 42, and a power source 44. FIG. 9A shows a specific saw-toothed waveform which inverts at a voltage level $V_1$. Assume that a signal having the saw-toothed waveform of FIG. 9A is fed to the base of the transistor 38 via an input terminal 46, and that a voltage having a voltage level $V_2$ is applied from the power source 44 to the base of the transistor 40. Then, there appears on the base of the transistor 38, which is interconnected to an output terminal 48, a voltage whose level has been shifted from the voltage level $V_1$ toward the negative side by a voltage Vbe across the base and emitter of the transistor 38, i.e., a voltage level $V_1 - Vbe$. When this voltage is lower than a voltage level $V_2 - Vbe$, it is cut off because the base-emitter of the transistor 38 is negatively biased. More specifically, voltages lower than the voltage level $V_2 - Vbe$ are not outputted via the output terminal 48. In this manner, the dark clipping circuit 36 functions to limit the amplitudes of the signal coming in through the input terminal 46 which are lower than a predetermined voltage level.

As described above, the illustrative embodiment prevents a signal including components lower than the pedestal level PL of non-inverted signals (voltage level at point e) and a signal including higher than the pedestal level PL of inverted signals (voltage level at point d) from being fed to the LC panels. This eliminates the light-and-dark inversion particular to the prior art, i.e., the phenomenom that portions of a picture which should be dark appears light. Hence, the edges of a picture which are apt to seem double to the viewer's eye due to light-and-dark inversion appear clear-cut, whereby picture quality far higher than the quality heretofore achievable is insured. Further, since the light-and-dark inversion is eliminated, the color signals to be applied to the individual LC panels can have pedestal levels which provide the associated LC panels with the lowest transmittance. This is successful in providing a picture with the maximum contrast.

SECOND EMBODIMENT

Figure 10:
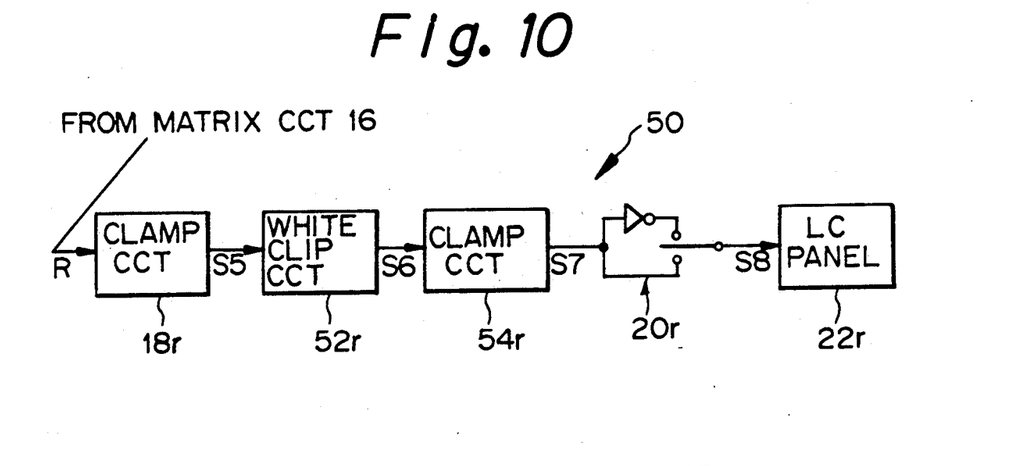
FIG. 10 is a schematic block diagram showing an alternative embodiment of the present invention.
Figure 11A:
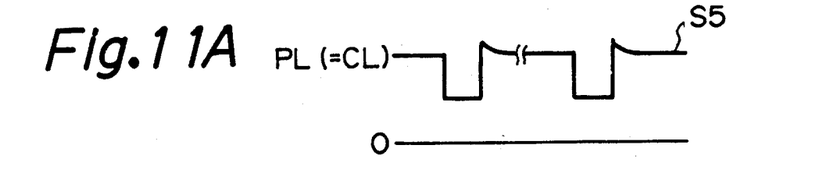
FIGS. 11A to 11D are diagrams each showing the waveform of a signal appearing in a different section of the alternative embodiment.
Figure 11B:
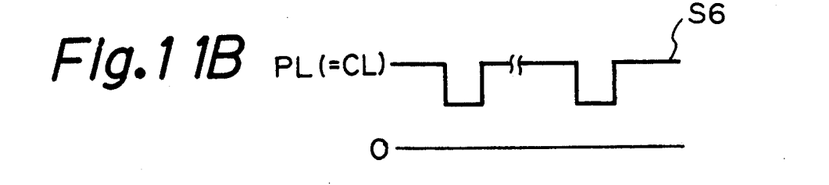
Figure 11C:
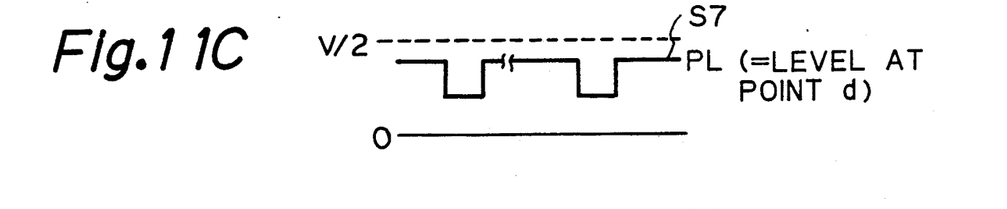
Figure 11D:
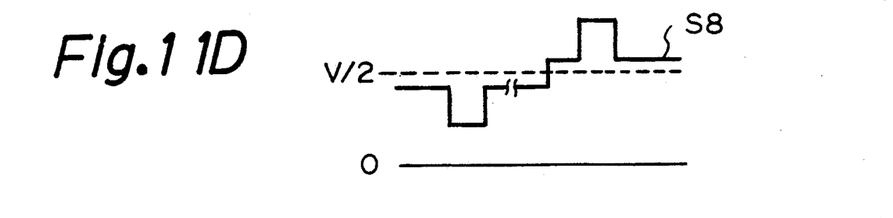

Referring to FIG. 10, an alternative embodiment of the present invention is shown. Since the circuit arrangements for processing the color signals R, G and B are identical, only the circuitry assigned to the color signal R will be described. The Y/C separating circuit 12, decoder 14 and matrix circuit 16 which precede the clamping circuit 18r are not shown in FIG. 10 because they are constructed in the same manner as in the previous embodiment. As shown in FIG. 10, the video signal processor, generally 50, has the clamping circuit 18r which receives the color signal R having been inverted by the matrix circuit 16. The clamping circuit 18r brings the pedestal level PL of the color signal R into coincidence with the clipping level CL of a white clipping circuit 52r which is interconnected to the clamping circuit 18r. The resultant output of the clamping circuit 18r is represented by a signal $S_5$ in FIG. 11A. The white clipping circuit 52r removes signal components higher than the pedestal level PL (i.e. clipping level CL) from the output of the clamping circuit 18r, the resultant signal being represented by a signal $S_6$ in FIG. 11B. The white clipping circuit 52r is interconnected to a clamping circuit 54r which produces a signal whose pedestal level PL is coincident with the level at the point d, as represented by a signal $S_7$ in FIG. 11C. The output signal of the clamping circuit 54r is fed to the switching circuit 20r to be thereby inverted and non-inverted field by field, whereby a signal $S_8$ shown in FIG. 11D is fed to the LC panel 22r.

Figure 12:
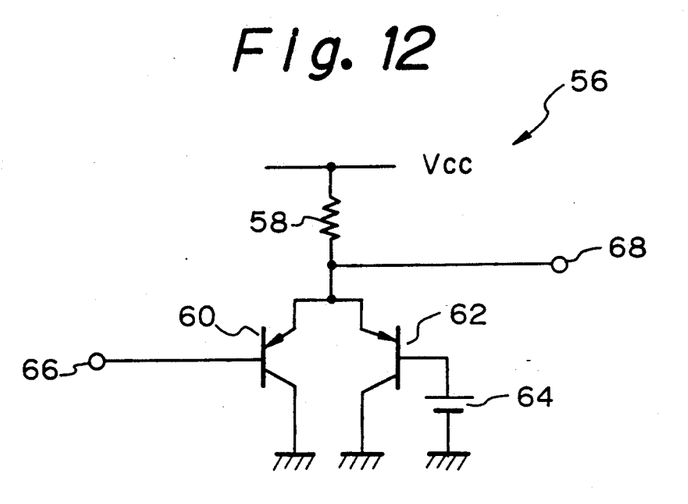
FIG. 12 is a diagram representative of a specific construction of a white clipping circuit included in the alternative embodiment.
Figure 13A:
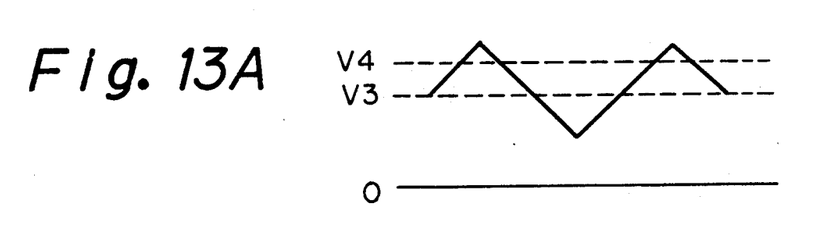
FIGS. 13A and 13B are diagrams showing the waveforms of signals appearing in different sections of the white clip circuit of FIG. 12.
Figure 13B:
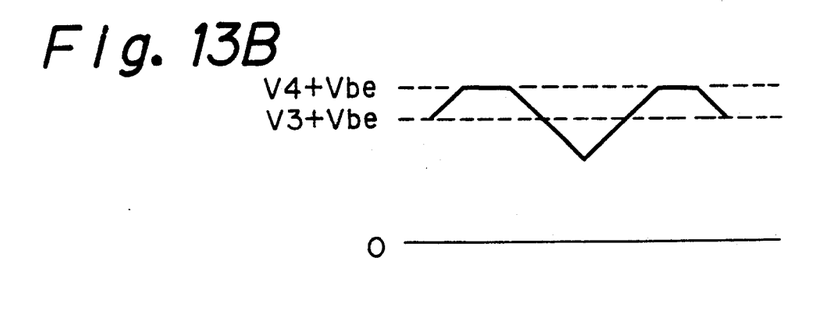

FIG. 12 shows a specific construction of the white clipping circuit 52r. As shown, the white clipping circuit generally designated by the reference numeral 56 has resistor 58, two transistors 60 and 62, and a power source 64. An input signal arriving at an input terminal 66 may have a saw-toothed waveform which inverts at a voltage level $V_3$, as shown in FIG. 13A. Assume that such an input signal is fed to the base of the transistor 60 via the input terminal 66, and that a voltage whose level is $V_4$ is applied from the power source 64 to the base of the transistor 62. The emitter of the transistor 60 is interconnected to an output terminal 68. As shown in FIG. 13B, a voltage whose level has been shifted from the level $V_3$ toward the positive side by a voltage Vbe across the base and emitter of the transistor 60, i.e., a level $V_3 + Vbe$ appears on the emitter of the transistor 60. However, when this voltage is higher than a voltage level $V_4 + Vbe$, it is cut off because the base-emitter of the transistor 60 is inversely biased. More specifically, voltages higher than the voltage level $V_4 + Vbe$ are not fed out via the output terminal 68. In this sense, the white clipping circuit 56 serves the function of limiting the amplitudes of voltages of the input signal which are higher than a predetermined voltage level.

This alternative embodiment are comparable with the previous embodiment with respect to the advantages over the prior art.

THIRD EMBODIMENT

Figure 14:
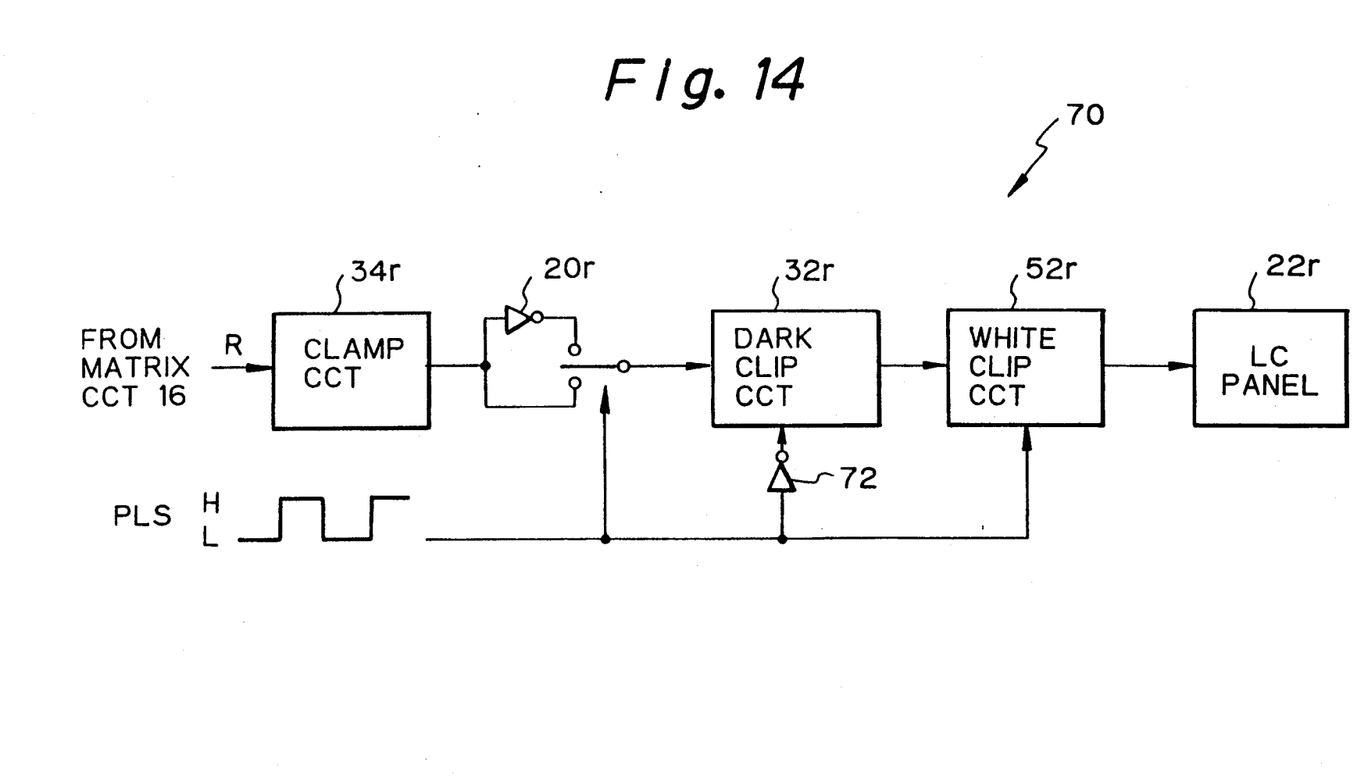
FIG. 14 is a block diagram showing another alternative embodiment of the present invention schematically.

Referring to FIG. 14, another alternative embodiment of the present invention is shown and generally designated by the reference numeral 70. In the figure, only the circuitry assigned to the color signal R is shown, and the Y/C separating circuit 12, decoder 14 and matrix circuit 16 are not shown. The color signal R from the matrix signal 16 which has not been inverted is applied to the clamping circuit 34r. The clamping circuit 34r causes the pedestal level PL of the color signal R to agree with the voltage level at the point e, FIG. 7. The switching circuit 20r inverts and non-inverts the coincident output of the clamping circuit 34r field by field with respect to the voltage level V/2. As a result, a pulse signal PLS which goes high and low field by field as shown in FIG. 14 is fed to the dark clipping circuit 32r and white clipping circuit 52r, causing the circuits 32r and 52r to operate in response thereto. Specifically, when the pulse signal PLS goes high (H), the switching circuit 20r produces an inverted color signal R while the white clipping circuit 52r removes a signal component higher than the pedestal level (voltage level at point d). At this instant, an inverter 72 associated with the dark clipping circuit 32r maintains the latter inoperative. On the other hand, when the pulse signal PLS goes low (L), the switching circuit 20r produces a non-inverted color signal R while the dark clipping circuit 32r removes a signal component lower than the pedestal level PL (voltage at point e). At this time, the white clipping circuit 52r is held inoperative. Consequently, a non-inverted signal free from a signal component lower than the pedestal level PL and an inverted signal free from a signal component higher than the pedestal level PL are fed out alternatively field by field.

It is to be noted that when the color signal R from the matrix circuit 16 is an inverted signal, the clamping circuit 34r will be replaced with the clamping circuit 54r.

FOURTH EMBODIMENT

Figure 15:
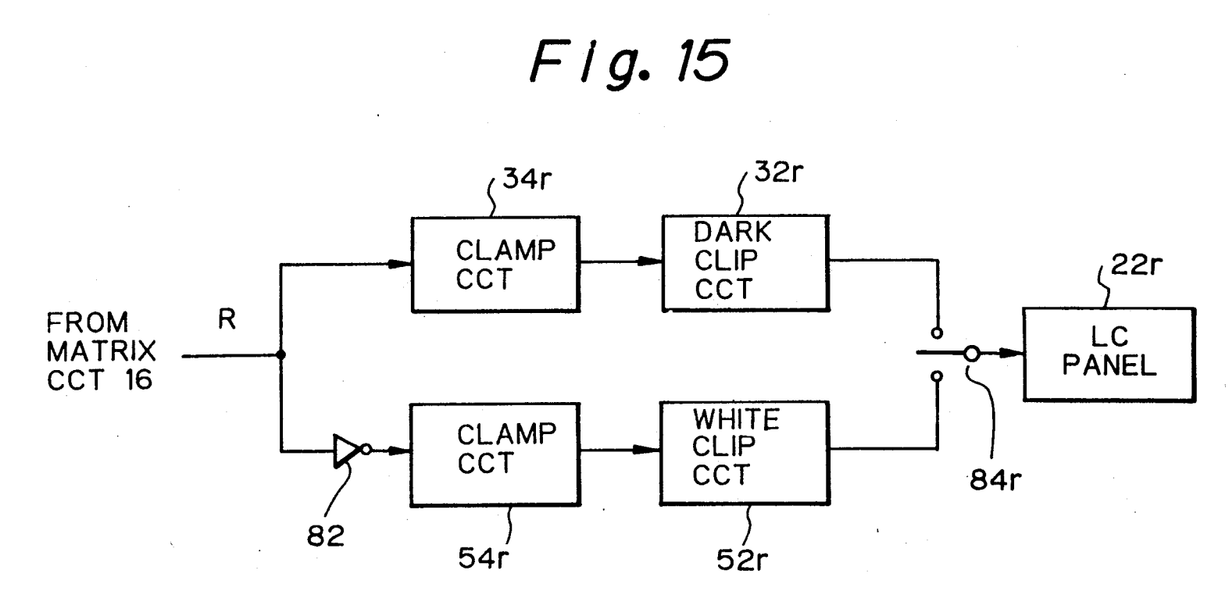
FIG. 15 is a block diagram showing still another alternative embodiment of the present invention schematically.

Referring to FIG. 15, still another alternative embodiment of the present invention is shown. Again, only the circuitry associated with the color signal R is shown, and the Y/C separating circuit 12, decoder 14 and matrix circuit 16 are omitted for the simplicity of illustration. As shown in the figure, the color signal R from the matrix circuit 16 is fed to the clamping circuit 34r and to the clamping circuit 54r via an inverter 82. The inverter 82 may invert the input signal with respect to any desired value in place of the voltage level V/2. The output signal of the clamping circuit 34r is routed through the dark clipping circuit 32r and a switching circuit 84r to the LC panel 22r. The output signal of the clamping circuit 54r is fed to the LC panel 22r via the white clipping circuit 52r and switching circuit 84r.

It should be noted that the third embodiment shown and described is feasible for IC implementation because the circuitry for inverting and non-inverting a signal is located at an earlier stage than in the first and second embodiments. This is because IC circuitry generally has an input signal inverting and non-inverting circuit immediately after an input amplifier which serves as a signal inlet.

In summary, it will be seen that the present invention provides a video signal processor for a color LCD which insures the maximum contrast available with LC panels of the LCD and, yet, eliminates light-and-dark inversion, thereby enhancing the reproduction of high quality pictures.

Various modifications will become possible for those skilled in the art after receiving the teachings of the present disclosure without departing from the scope thereof.

What is claimed is:

1. A video signal processor for processing a video signal to be fed to liquid crystal (LC) panel means which displays a reproduced picture thereon, comprising:
    clipping means for removing signal components lower than a pedestal level of the video signal to be fed to the LC panel means; and
    clamping means for causing either one of an input signal to and an output signal from said clipping means to coincide with a voltage level of an input voltage which reduces transmittance of the LC panel means to the lowest transmittance.

2. A video signal processor as claimed in claim 1, further comprising second clamping means for causing the pedestal level of the video signal to coincide with a clipping level of said clipping means, and switching means for inverting and non-inverting field by field said video signal which has been caused into coincidence by said second clamping means.

3. A video signal processor as claimed in claim 1, wherein said output signal of said clipping means is fed to said clamping means, said clipping means comprising either one of a dark clipping circuit and a white clipping circuit.

4. A video signal processor as claimed in claim 1, wherein said input signal to said clipping circuits is fed from said clamping means, said clipping means comprising a dark clipping circuit and a white clipping circuit.

5. A video signal processor as claimed in claim 4, wherein said dark clipping circuit and said white clipping circuit are connected in series, one of said dark clipping circuit and said white clipping circuit receiving a pulse while the other receiving an inverted pulse of said pulse.

6. A video signal processor as claimed in claim 4, wherein said clamping means comprises a first clamping circuit connected in series with one of said dark clipping circuit and said white clipping circuit, and a second clamping circuit connected in series with the other clipping circuit, said first clamping circuit and said second clamping circuit being connected in parallel with each other.

* * * * *